(12) United States Patent  
Murray

(10) Patent No.: US 6,290,622 B1
(45) Date of Patent: Sep. 18, 2001

(54) MECHANICAL FORCE GENERATOR

(76) Inventor: Lawrence D. Murray, P.O. Box 184, Kingsland, GA (US) 31548

( * ) Notice: Subject to any disclaimer, the term of this patent is extended or adjusted under 35 U.S.C. 154(b) by 0 days.

(21) Appl. No.: 09/537,335

(22) Filed: Mar. 29, 2000

(51) Int. Cl.[7] ............................. F16H 55/12; F16H 55/14
(52) U.S. Cl. ................................................ 475/162; 74/61
(58) Field of Search ................................. 475/162, 170, 475/163; 74/61, 84 R, 87, 88, 89.1

(56) References Cited

U.S. PATENT DOCUMENTS

| | | |
|---|---|---|
| 1,983,852 | 12/1934 | Hercher . |
| 3,263,529 | 8/1966 | Borisoff . |
| 3,439,561 | 4/1969 | Preston . |
| 3,960,036 | 6/1976 | Moller . |
| 4,072,066 | 2/1978 | Mount . |
| 4,242,918 | 1/1981 | Srogi . |
| 4,361,055 | * 11/1982 | Kinson ................................. 74/5.22 |
| 4,744,259 | 5/1988 | Peterson . |
| 5,150,626 | * 9/1992 | Navarro et al. ....................... 74/84 R |
| 5,309,778 | * 5/1994 | Antonov ............................. 74/15.86 |

FOREIGN PATENT DOCUMENTS

3805687 * 6/1988 (DE) .

* cited by examiner

Primary Examiner—Sherry Estremsky
Assistant Examiner—Tisha D. Lewis
(74) Attorney, Agent, or Firm—Hinkle & Associates, PC

(57) ABSTRACT

A mechanical force generator for producing a directional force by converting centrifugal force energy to a directional force by rotating a cage assembly about its longitudinal axis which then turns secondary shafts which rotate sets of eccentrics to produce a net unidirectional force in a direction which is transverse to the axis of rotation of the cage assembly. Two pairs of eccentrics rotate such that for each 90° of carrier cage rotation, the pairs of eccentrics have their mass centers positioned alternately between a balanced condition and an unbalanced condition, but, for each 90° of rotation, one pair of eccentrics is always developing a power stroke. A timing mechanism is connected to the carrier cage to change the phase relationship between the carrier cage and the holding frame to vary the resultant force output.

6 Claims, 7 Drawing Sheets

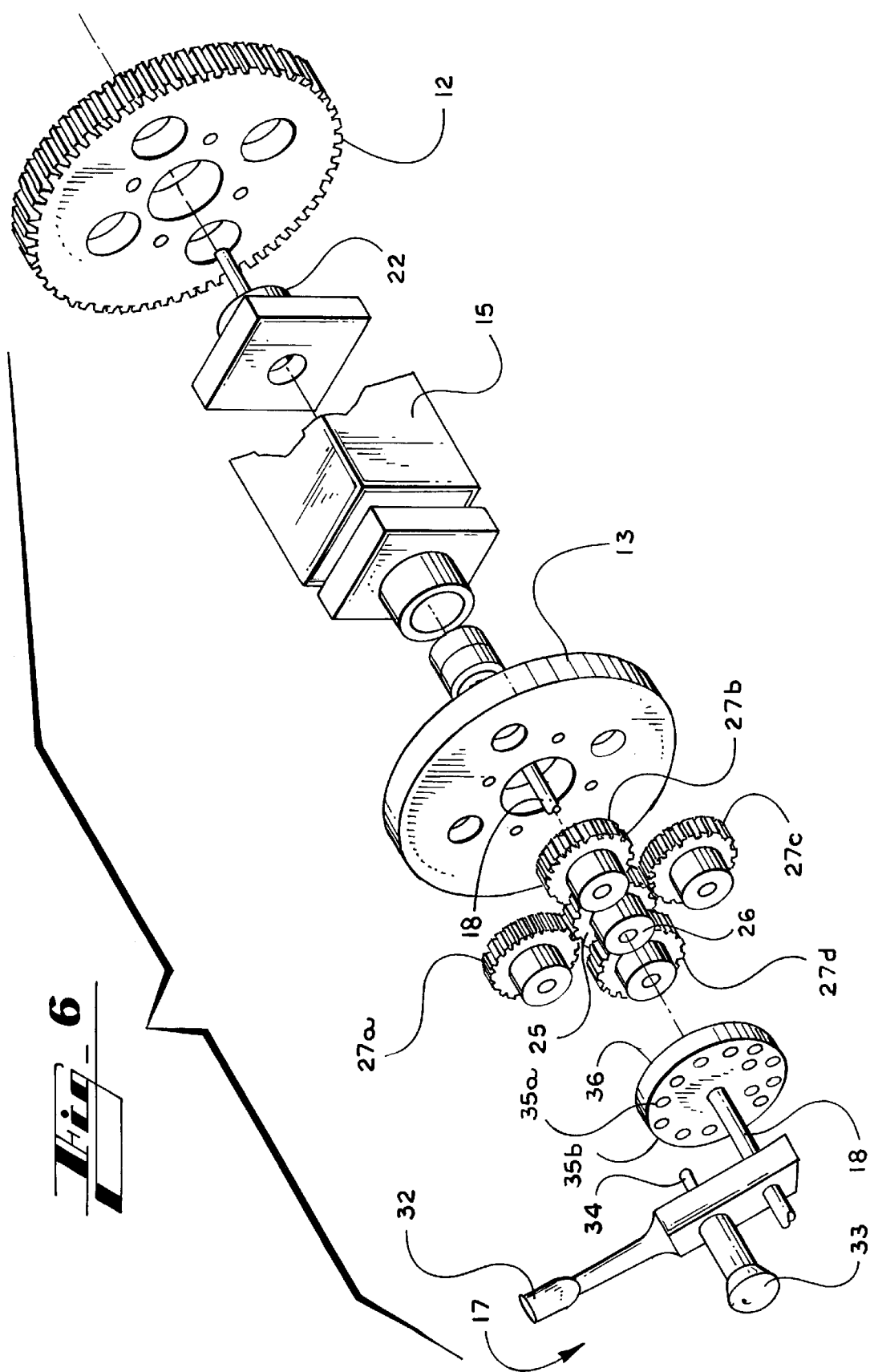

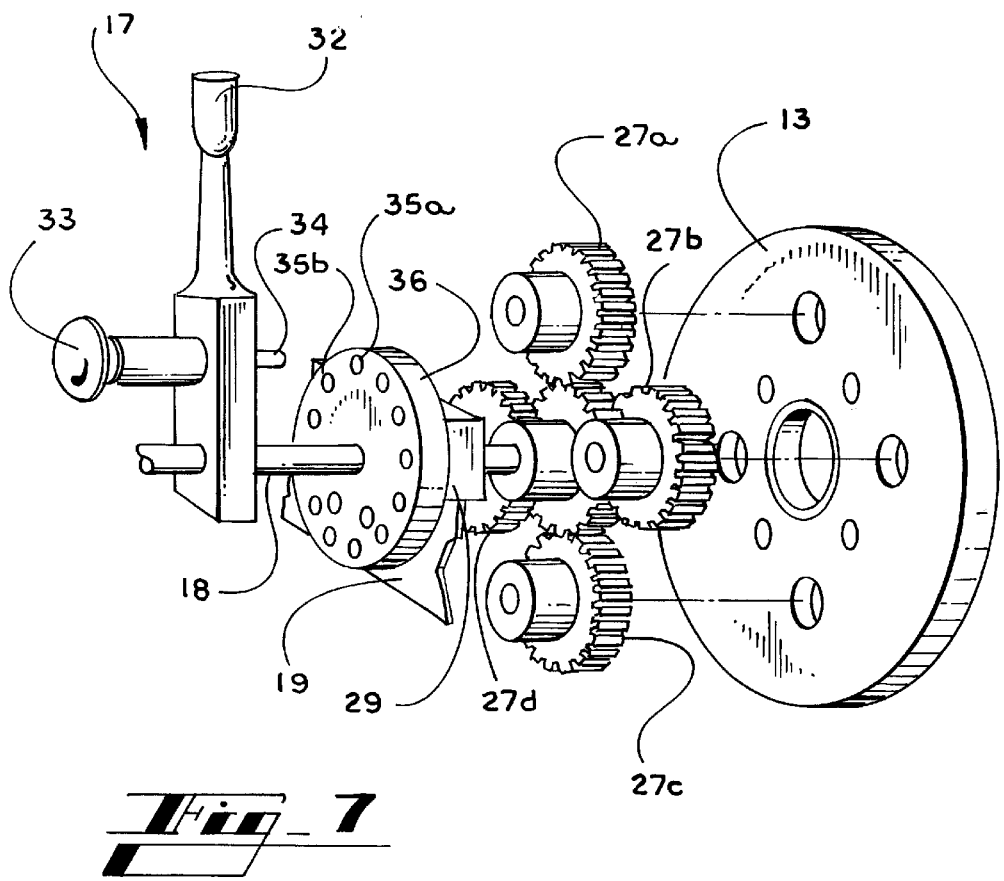
Fig_7
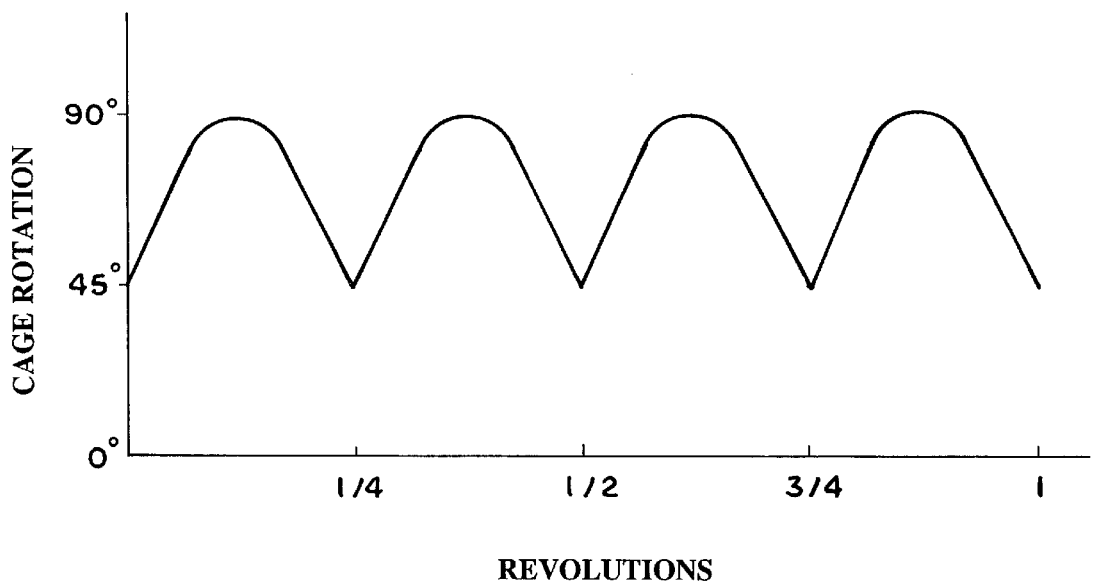
REVOLUTIONS
Fig_8

MECHANICAL FORCE GENERATOR

BACKGROUND OF THE INVENTION

1. Field of the Invention

The present invention relates generally to an apparatus for producing a directional force, and more particularly to an apparatus for converting centrifugal energy to a directional force by rotating an assembly about its longitudinal axis which then turns secondary shafts which turn right angle bevel gears to rotate sets of eccentrics to produce a net unidirectional force in a direction which is transverse to the axis of rotation of the longitudinal axis of the apparatus.

2. Description of the Related Art

Various devices are well known in the prior art which transmit energy and converts that energy from linear to rotational and vice versa. Many such devices use eccentrics to modify the resultant force output.

For instance, the patent to Mount (U.S. Pat. No. 4,072,066) discloses a transmission which uses eccentrics to control power output by having the eccentrics mounted transversely to the drive axis to modify the drive ratio of a planetary gear transmission by centrifugal force associated with a rotor assembly having an imbalance that varies as a function of the speed of oppositely rotating eccentric rotor elements relative to a carrier frame mounting planetary gears drivingly connected to a spider on which the rotor assembly is mounted.

In the Peterson Patent (U.S. Pat. No. 4,744,259) there is disclosed a device for generating a unidirectional force comprising a rotary body carrying around its periphery a plurality of pivotal pendulum masses mounted on shafts parallel to the axis of rotation of the rotary body so that the pendulum masses swing transversely to the main access of rotation. As the device rotates, each pendulum mass flings outwardly to produce a unidirectional force symmetrical about a central axis.

The Moller Patent (U.S. Pat. No. 4,307,629) discloses a torque converter having an input shaft, an output shaft and preferably three or more torque generating trains each having a rotatable shaft whose axes are fixed relative to the axis of an input shaft. Each of the torque generating trains has a pair of double-weight torque generators thereon wherein the weights are eccentrically mounted upon the shaft of their respective torque generating trains. However, in each torque generator a pair of substantially identical weights are mounted for freedom of rotation relative to a pair of cylindrical bearing surfaces which are eccentrically positioned relative to the axis of their torque generating train shafts and which have their eccentricities 180° apart on the shafts. As the cage of the device is spun about the axis of its torque generating train, the eccentrically mounted weights are also spun with the cage and the weights apply torque to the shafts of their torque generating trains.

SUMMARY OF THE INVENTION

In accordance with the present invention and the contemplated problems which have and continue to exist in this field, the present invention will produce a unitary unidirectional force which may be directed angularly transversely from the central axis of rotation of the device as needed.

The invention accomplishes the above and other objects of the invention by utilizing rotating masses to achieve a unidirectional force. The invention comprises a cage-like housing mounting at one end thereof an outer ring gear and at the other end an end plate. A planetary gear assembly is mounted adjacent the end plate. Extending laterally between the ring gear and the end plate is a centrally mounted main shaft and a plurality of spaced parallel secondary shafts. The sun gear of the planetary assembly is centrally received on the central longitudinal axis located between the outer ring gear and the end plate. The sun gear communicates with planetary gears located therearound which are affixed to the secondary shafts. The secondary shafts have right angle bevel gears attached thereto and each secondary shaft communicates with an eccentric which rotates on a shaft transversely to the central longitudinal axis and the axis of the secondary shafts. There are two sets of cooperating eccentrics and, as the planetary gears orbit about the sun gear, the eccentrics are rotated so that the eccentrics produce a unidirectional power stroke every 90° of rotation of the force converter. A timing mechanism is associated with the planetary gear system to effect an angular direction of the power stroke with respect to the rotating cage. In this manner, the power output and the direction thereof is fully controllable by the timing mechanism.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 6 is an exploded partial perspective view of the central support shell along with gears at the input and output ends;

FIG. 7 is an exploded partial perspective view of the output end showing the timing mechanism; and FIG. 8 is a graphical representation of the eccentric orbital path for one complete revolution showing the power curve having a power stroke every 90°.

DESCRIPTION OF THE PREFERRED EMBODIMENT

Figure 1:
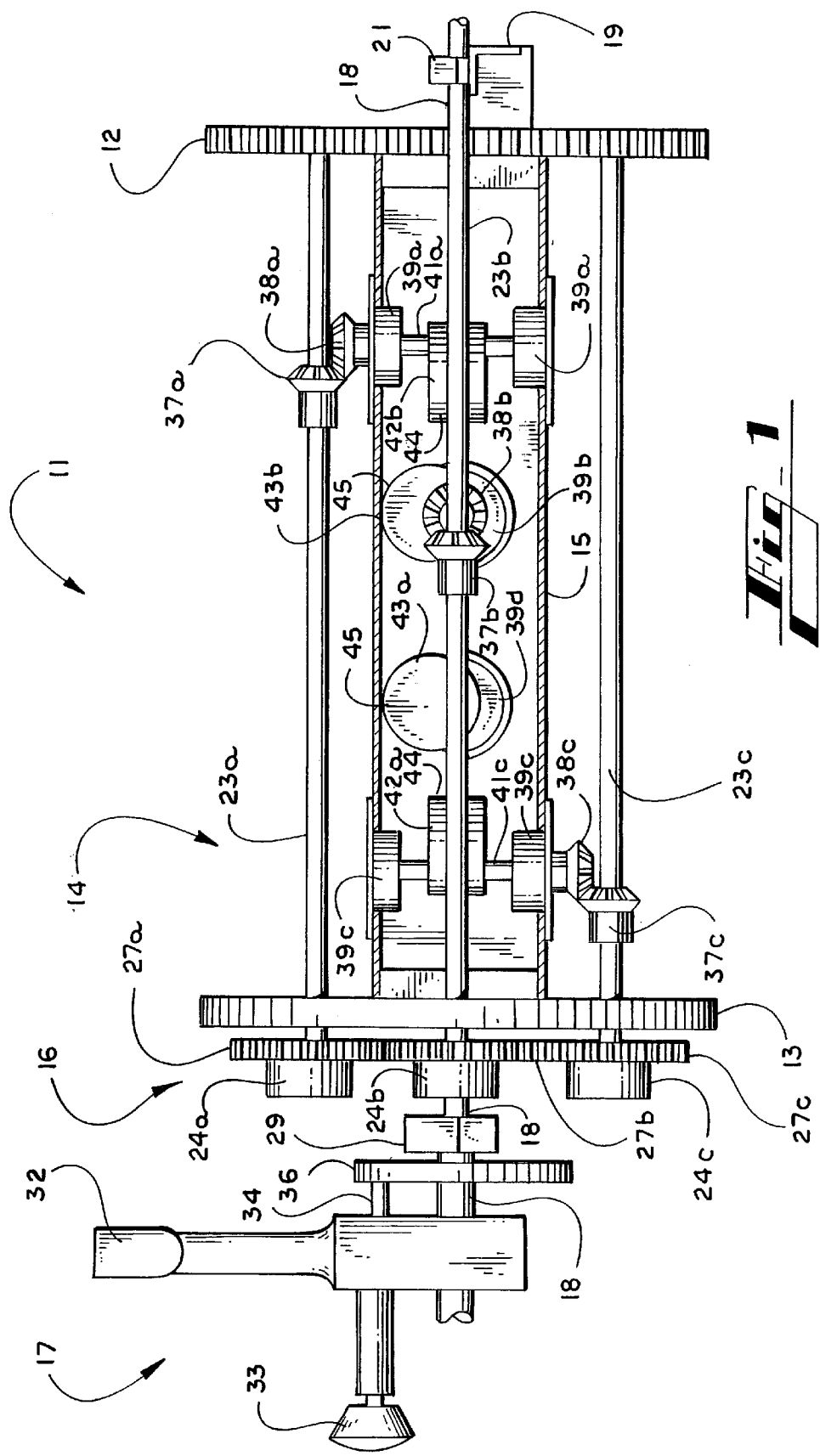
FIG. 1 is a side elevation view of the invention.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1 which shows the basic configuration for the force converter 11. It should be noted that the force converter 11, as shown herein, is very rudimentary and basic in configuration, but the parts and description pertaining to the parts and operation of the force converter accurately defines the concept of the invention. It should be noted that the materials shown in the drawings herein are generally off-the-shelf items to prove and show the concept. However, in actual practice, it is anticipated that various sophisticated materials would be utilized in assembling and practicing the invention and such materials are contemplated.

The force converter 11 comprises the input outer ring gear 12 at the proximal end thereof and the gear train mounting plate 13 at the distal end thereof, wherein the ring gear 12 and the mounting plate 13 encompass therebetween the carrier cage apparatus 14. Within the cage apparatus 14 is a shell 15 for mounting the eccentrics which will be described later. Distally from the gear train mounting plate 13 is a planetary gear system 16 for effecting movement of the eccentrics. Distally of the planetary gear system 16, and connected to the sun gear of the system, is a timer mechanism 17 for controlling the output direction of the resultant force produced by the force converter.

Figure 5:
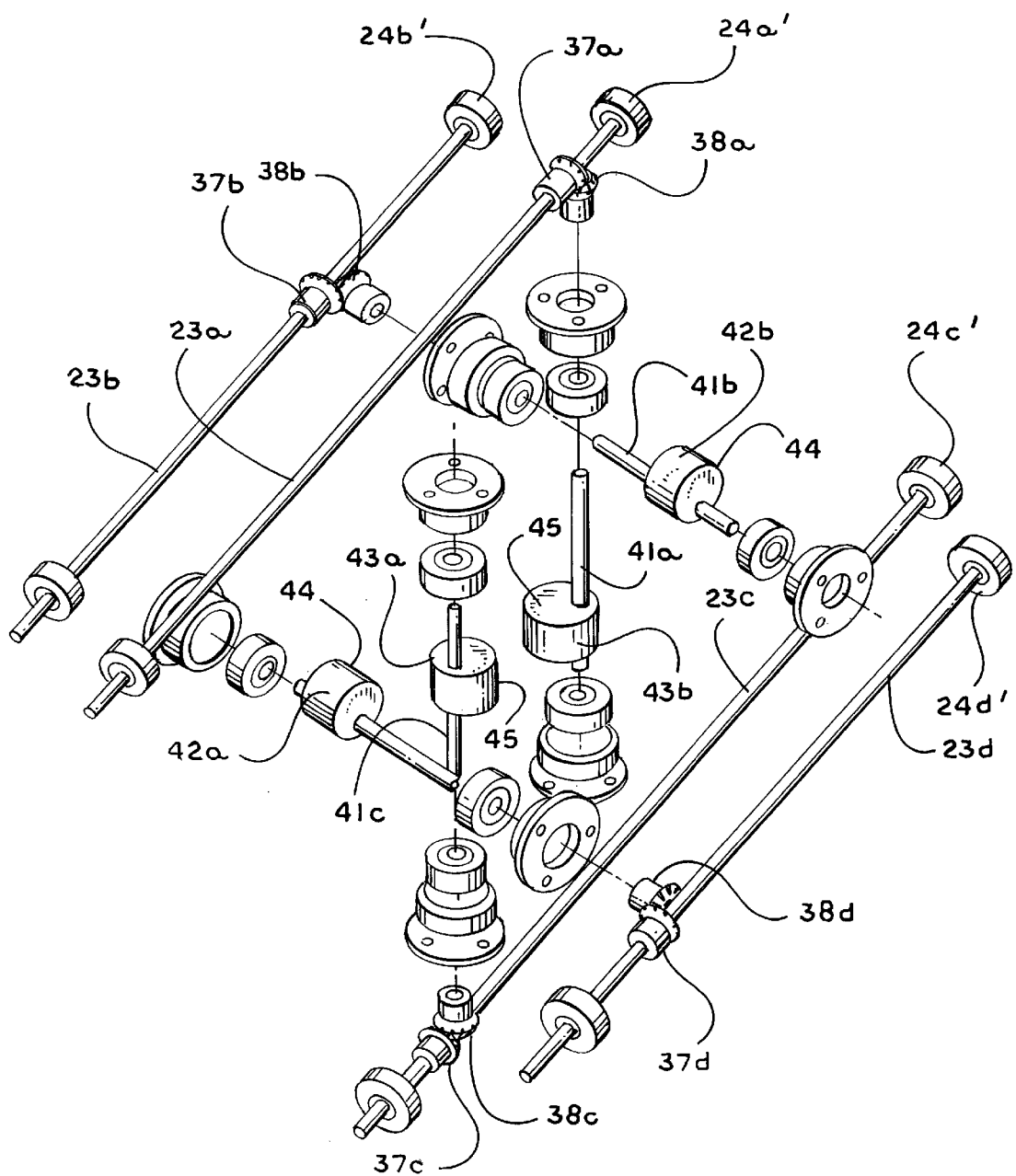
FIG. 5 is an exploded partial perspective view of the construction and placement of the control shafts and eccentrics.

The input ring gear 12 accepts input power from a rotational power supply of suitable design and efficiency. A power supply for serving the force converter is herein should be one which is efficient and of light weight, yet will produce a sustained power output for extended periods of time using relatively small quantities of fuel for best efficiency. As the ring gear 12 revolves, and in the case to be described herein, the ring gear is assumed to revolve in a counterclockwise direction when looking at the end of the ring gear 12 longitudinally along the main shaft 18 from the proximal end thereof. The main shaft 18 is non-rotatable and is fixed to a mounting frame 19 by the axis shaft mount 21. In the present invention, ring gear 12 will have centrally located therein a suitable bearing 22 (see FIG. 6) so that the ring gear will rotate around the non-rotatable access shaft 18. Positioned between ring gear 12 and gear train mounting plate 13 are four minor axes 23a, 23b, 23c and 23d. Each of the minor axes are independently rotatable within the ring gear 12 and the gear train mounting plate 13 by respective bearings 24a, a' and 24b, b' and 24c, c' and 25d, d' all mounted in the respective ring gear 12 or gear train mounting plate 13 as is shown in FIG. 5.

The planetary gear system 16 (as shown in FIGS. 1 and 6) is mounted to the non-rotatable distal end of the main axis shaft 18 by having the sun gear 25 rotatably mounted upon the axis shaft 18 by means of fitted bearing 26 within the mounting plate 13. Each of the planetary gears 27a, 27b, 27c and 27d are respectively mounted to the minor axes as shown in FIG. 1. In order for the planetary gears to rotate about the minor axes, the gears are suitably mounted on the axes by bearings 28a, 28b, 28c and 28d. The distal end of the force converter is mounted to the mounting frame 19 (not shown for clarity purposes in the drawings) by an axis shaft mount 29 which mounts the distal end main axis 18 therein. As was noted, sun gear 25 is fixedly mounted to the distal end main axis shaft 18, however, the distal end main axis shaft 18 is suitably positioned within the axis shaft mount 29 for limited rotational purposes.

The reason that the distal main axis shaft 18 is only of limited rotational capacity is for the reason that the gear train mounting plate 13 rotates around the distal main axis shaft 18 upon a bearing 31, which bearing resides within the mounting plate 13, and this allows the entire cage apparatus 14 to freely rotate about the shafts 18. However, as noted, the distal shaft 18 does have limited rotational capability and this may be effected by frictionally mounting the shaft in shaft mount 29 relatively tightly, or may be effected by having a concentric double shaft for the distal major access shaft 18. The purpose of the limited rotational capability of the shaft, to which sun gear 25 is affixed, is to allow the timer mechanism 17 to be rotated, which rotation will revolve distal main axis shaft 18 a desired angular amount for timing purposes as will be later described. The timing mechanism 17, as noted, is mounted to shaft 18 and, upon angularly rotating the timing control handle 32, distal main axis shaft 18 is caused to rotate which, in turn, rotates the sun gear 25. In order to effect such rotation, the pullout spring-loaded knob 33 is retracted which causes lock plunger 34 to be retracted from a locking aperture 35a within the timer index ring 36 which is firmly and fixedly mounted to the distal axis shaft mount 29 so that the index ring will not turn. As can be seen in the figures, the distal main axis shaft 18 passes through the timer index ring and is capable of limited frictional rotation therein. As the timing control handle 32 is rotated, the lock plunger 34 may be repositioned in any of the locking apertures 35 depending upon which direction the resultant force output is desired to be directed.

Referring once again to FIG. 1, and to the cage apparatus 14, it is noted that each of the minor axes 23 have mounted thereon respective right angled bevel gears 37a, 37b, 37c and 37d. Each of the bevel gears 37 are fixedly mounted on the respective minor axis shafts and the respective bevel gears mesh with a respective bevel gear 38a, 38b, 38c and 38d rotatably mounted within respective bearings 39a, 39b, 39c and 39d within the shell 15. As will be seen, the bevel gears 38 are affixed to respective shafts 41a, 41b, 41c and 41d, which shaft rotate within the respective bearings 39.

Upon the bevel shafts 41, there are fixedly mounted, at the midpoint of the shafts, eccentrics which impart the desired output force to the force converter 11. These eccentrics are mounted in cooperating pairs with the first pair of eccentrics being designated 42a and 42b, and the second pair of eccentrics being designated as 43a and 43b. For convenience sake, the first pair of eccentrics 42a and 42b will be designated as the distal eccentrics, and the second pair of eccentrics 43a and 43b will be designated as the proximal eccentrics.

In operation of the invention, power is directed to the outer ring gear 12 which, when looking at the end thereof from the perspective of sighting down main shaft 18 along proximal axis shaft mount 21, the ring gear will revolve in a counter-clockwise direction. As the ring gear 12 revolves, it carries with it the cage 14 along with the minor axes 23, the gear train mounting plate 13 and the planetary gear system 16. To better understand the operation of the invention, assume that the representation of FIG. 1 is position 1 and that the timing handle 32 of timing mechanism 17 is pointed vertically and lies in a plane which is the same plane that passes through minor axes 23a and 23c, as shown in FIG. 1. As the force converter 11 rotates, the planetary gears 27 will revolve around the sun gear 25 and cause the minor axes 23 to revolve, thereby rotating bevel gears 37 which in turn will rotate bevel gears 38 turning eccentric shafts 41 and rotating the eccentric pairs 42 and 43. As shown in FIG. 1 at position number 1, the distal eccentric pairs 42a and 42b are in a position wherein the major plane of the eccentrics lie in the same plane which passes through minor axes 23b and 23d. The mass center portions 44 of each of the first pair of eccentrics 42 are so positioned that the mass center portions face one another within the shell. In position number 1 the second pair of eccentrics 43 are positioned on shafts 41b and 41d such that the mass center portions 45 of the eccentrics 43 are positioned vertically and the major plane of the eccentrics lie in a plane which passes through minor axes 23a and 23c.

As the ring gear 12 rotates, the entire force converter cage apparatus 14 rotates turning the minor axes 23 to rotate the eccentrics in a predetermined path. As the cage rotates, eccentrics 42 will rotate oppositely to one another and, in the case herein described, eccentric 42a will rotate clockwise (looking down upon the top of the cage apparatus 14) and eccentric 42b will rotate counterclockwise. Accordingly, eccentrics 43a and 43b will also rotate oppositely to one another, wherein eccentric 43a will rotate clockwise and eccentric 43b will rotate counterclockwise (looking at the side view of FIG. 1).

Figure 2:
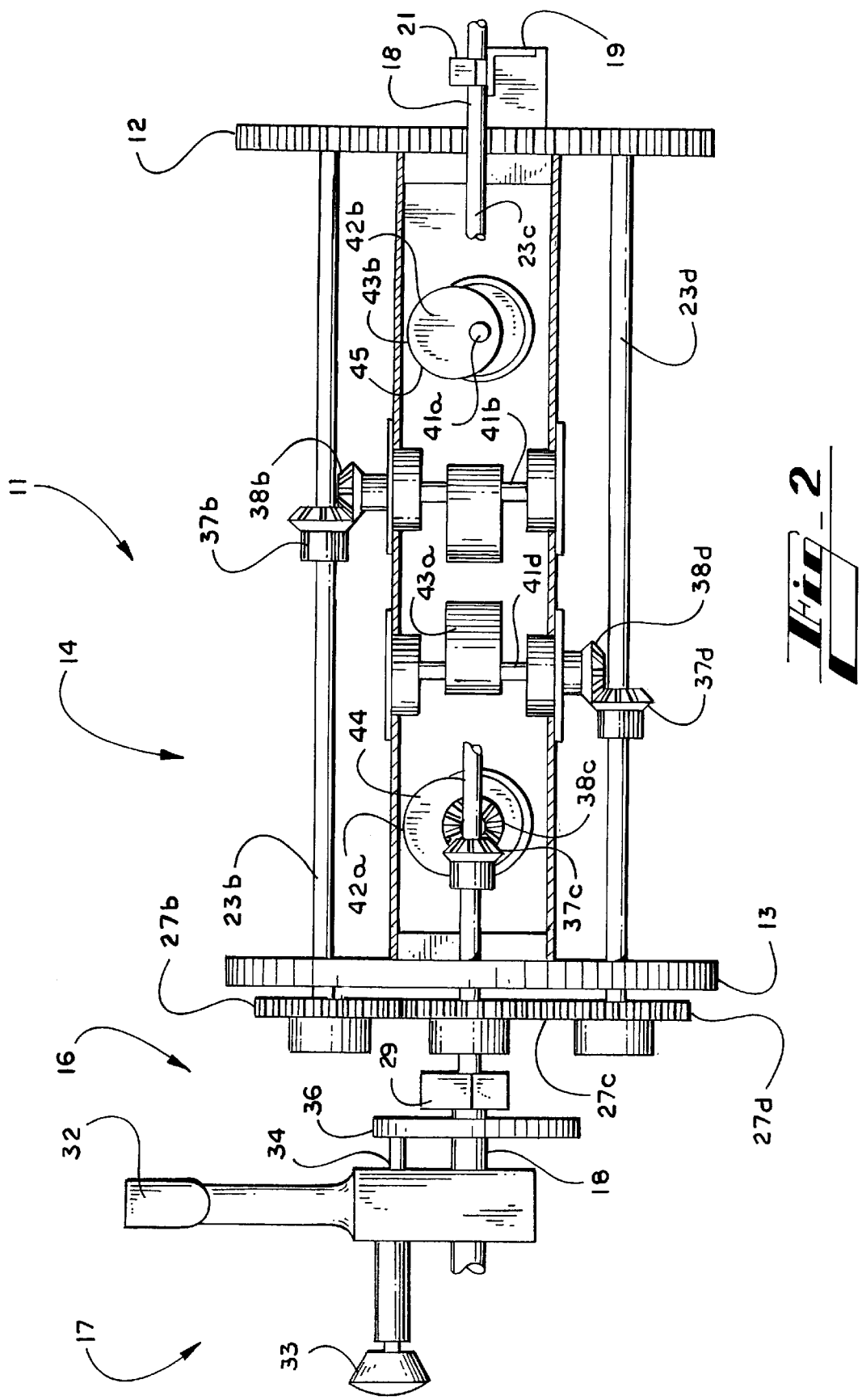
FIG. 2 is a side elevation view showing the cage rotated 90° from the position of FIG. 1, and showing a portion in partial section for clarity.

After a full 90° rotation of cage apparatus 14, the force converter will be in the position as shown in FIG. 2 which is identified as position 2. It should be noted that, as described in the description of the figures, the description herein is looking at a side elevation view of the force converter 11. In FIG. 2, the result of 90° rotation shows that eccentrics 42a and 42b are now positioned vertically designating that a power output force has been developed in the vertical direction of a plane which lies now through minor axes 23b and 23d. At position number 2, eccentrics 43a and 43b are so positioned that the mass center portions of the eccentrics are facing inwardly toward one another indicating that the force component exerted by these two eccentrics cancel out one another. Therefore, the resultant force is only developed by eccentrics 42a and 42b.

Figure 3:
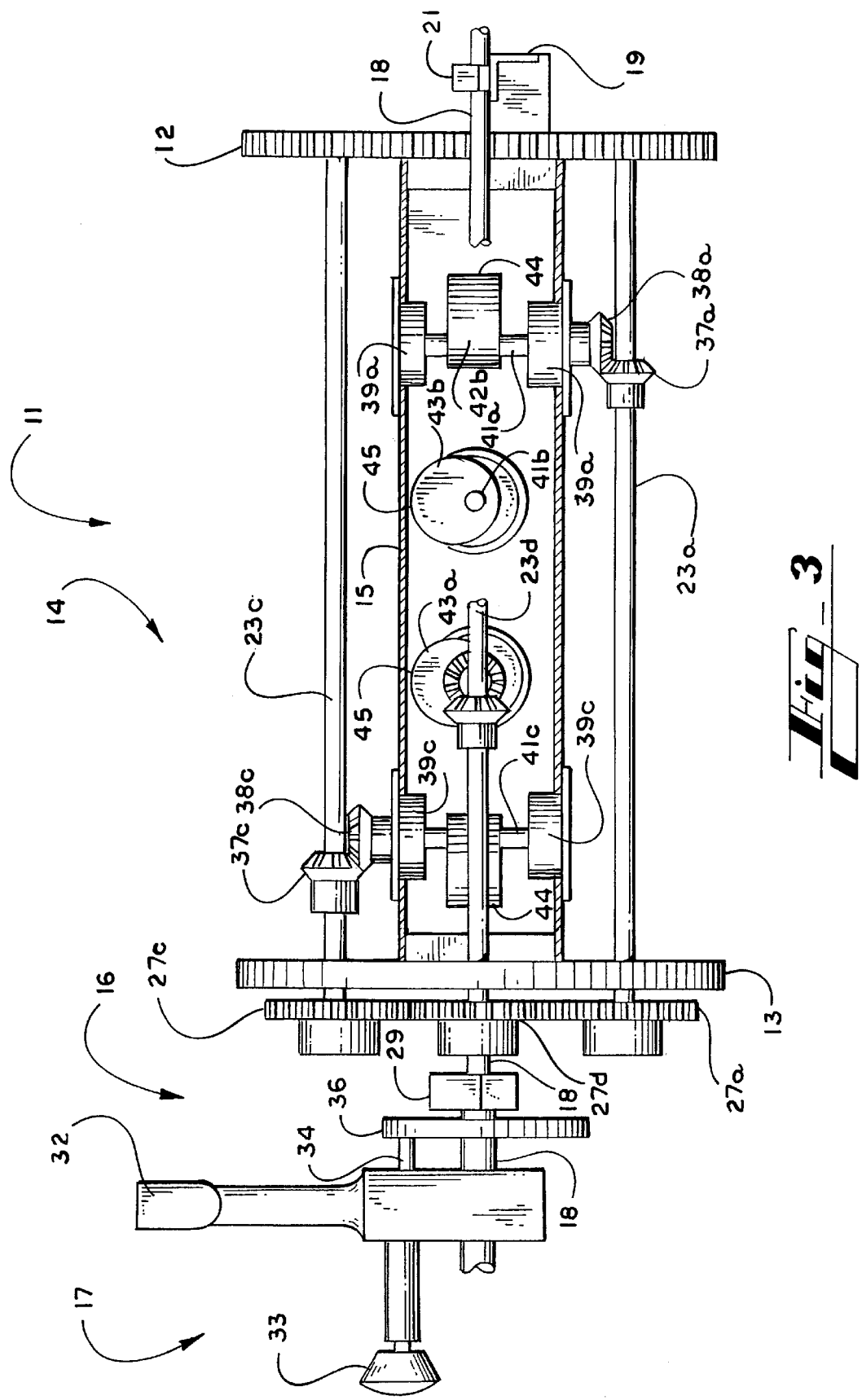
FIG. 3 is a side elevation view showing the cage rotated 180° from the position of FIG. 1, and showing a portion in partial section for clarity.

As the ring gear 12 continues to rotate another 90° in the clockwise direction, it is seen that eccentrics 42a and 42b begin to rotate oppositely toward the respective ends of the force converter and the eccentrics 43a and 43b also rotate oppositely, and as the entire cage rotates to a full 180° (a one-half rotation) the result is as shown in FIG. 3 and is position 3 showing eccentrics 42a and 42b having the mass center portion 44 pointing toward the respective ends defined by ring gear 12 and gear train mounting plate 13 while eccentrics 43a and 43b now have their respective mass center portions 45 pointing vertically indicating that another power stroke has been developed in the vertical direction after a second is 90° rotation of the cage apparatus 14, and that eccentrics 42a and 42b are facing oppositely from one another and, therefore, cancel the forces that are generated.

Figure 4:
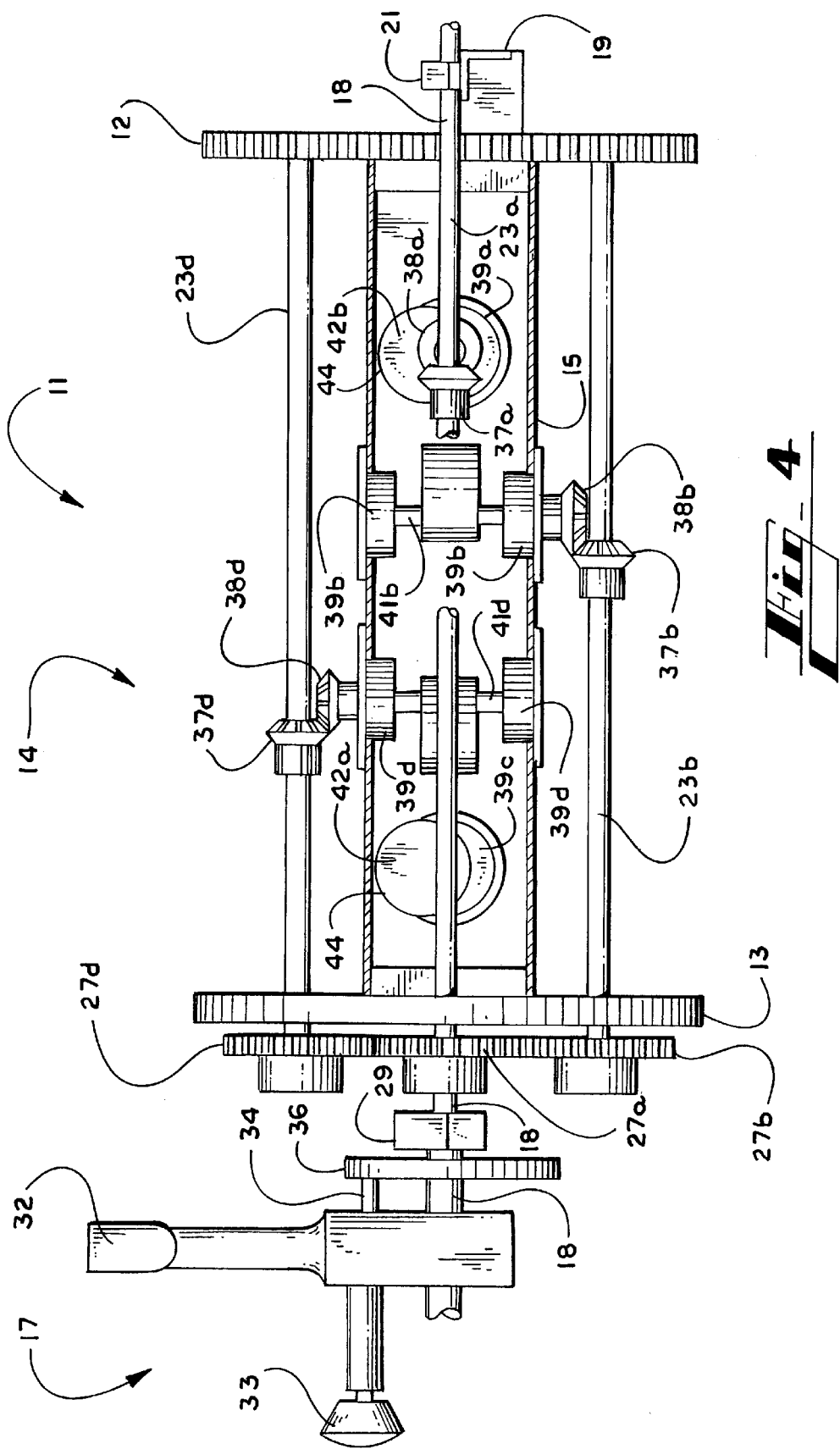
FIG. 4 is a side elevation view showing the cage rotated 270° from the position of FIG. 1, and showing a portion in partial section for clarity.

As the cage apparatus 14 rotates from position 3 of 180° rotation to position 4 of 270° rotation, as depicted in FIG. 4, it is noted that eccentrics 42a and 42b now have been repositioned in a vertical plane with the respective mass center portions 44 pointing in a vertical direction giving a power stroke in that plane while the second pair of eccentrics 43 have been rotated to a cancelling position where the mass center portion 45 of each eccentric 43 now faces outwardly toward the respective ends of the converter 11, thereby giving a net resultant force in a vertical direction. Again, as the cage apparatus 14 rotates from position 4 to position 1 (a full 360° rotation), the eccentrics continue their respective rotations and end up at the position shown in FIG. 1 with another resultant power stroke.

The timing mechanism 17 is an integral and important part of the present invention, and is capable of determining the resultant net unidirectional force component of the force converter and the direction to which the force will be directed. The previous discussion has all been made with the assumption that the timing control handle is pointed vertically and has not been rotated to effect any particular timing, other than to time the unit in a vertical direction. However, if the handle 32 is rotated and since it is fixed to shaft 18 on which sun gear 25 is fixed, then the rotation of handle 32 will also rotate sun gear 25. For instance, if handle 32 initially starts off in the most vertical locking aperture 35a then the directional force will be vertical as just described. However, should the handle 32 be rotated so that locking plunger 34 be placed in locking aperture 35b, in this instance a rotational move of 30°, it will be seen that the sun gear will also rotate thereby rotating the minor axes 23 and effecting a movement of eccentric pairs 42 and 43. It is assumed that the ring gear 12 does not move and that the cage apparatus 14 remains stationary. When this happens, the eccentrics rotate an equivalent 30° on their respective axes and, therefore, when the ring gear is at top dead center as in position 1 of FIG. 1, the eccentrics have not yet reached the full power stroke. It is not until the ring gear would move to a 30° position off top dead center that the eccentrics would be at a full power stroke as shown in position 1 of FIG. 1. In this manner, the timing mechanism therefore changes the direction of the resultant net output force of the force converter to a position which corresponds with the timing mechanism 17, and, in this case, essentially in the direction which timing control handle 32 points. Therefore, it can be seen that the timing mechanism may be used to change direction of the resultant net output force as desired, and will allow the force converter to direct a force in any direction transverse to the longitudinal axis thereof.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A force generator comprising:

a circular rotational force input member, a circular gear train mounting member, a carrier cage apparatus, a frame for mounting thereon the input member, the circular gear train member and the carrier cage apparatus, the carrier cage apparatus being rotational capable in response to a rotational force applied to the input member, the cage apparatus interconnecting the input member and the gear train mounting member, the carrier cage apparatus having at least four rotational minor axes each having a distal end rotatably mounted in the input member and a proximal end rotatably mounted in the gear train mounting member, the carrier cage apparatus further having a plurality of rotatable eccentrics, is each eccentric being mounted on a shaft positioned transversely to the minor axes, each of the minor axes being drivingly connected to a corresponding axis to which an eccentric is mounted, each eccentric having a mass center, a first eccentric being mounted for rotation adjacent to the gear train mounting member and a fourth eccentric being mounted for rotation adjacent to the input member and defining a space therebetween, the mass centers of the first and fourth eccentrics being so mounted that the mass centers rotate in opposite directions from one another, and a second eccentric being mounted for rotation in the spaced defined by the first and fourth eccentrics and being adjacent to the first eccentric, a third eccentric being mounted for rotation in the spaced defined between the first and fourth eccentrics and being mounted adjacent to the fourth eccentric wherein the mass centers of the second and third eccentrics being so mounted that the mass centers rotate in opposite directions from one another.

2. A force generator as claimed in claim 1, wherein:

the first and fourth eccentrics being mounted on respective eccentrics mounting shafts and being synchronously rotated on said shafts as the carrier cage is being rotated such that for each 90° of carrier cage rotation the first and fourth eccentrics rotate in 90° about said shafts to position the mass centers of said eccentrics alternately between a balanced condition and an unbalanced condition, and the second and third eccentrics being mounted on respective eccentrics mounting shafts and being synchronously rotated on said shafts as the carrier cage is being rotated such that for each 90° of carrier cage rotation the second and third eccentrics rotate 90° about said shafts to position the mass centers of said eccentrics alternately between a balanced and unbalanced condition such that the first and fourth pair of eccentrics and the second and third pair of eccentrics are alternately balanced every 90° of rotation of the carrier cage.

3. A force generator as claimed in claim 2 further comprising a planetary gearing system of planetary gears revolving about a sun gear mounted to the circular gear train mounting member.

4. A force generator as claimed in claim 3 further comprising a timing mechanism connected to the carrier cage apparatus to change the phase relationship between the carrier cage apparatus and the frame to angularly vary the resultant force output.

5. A force generator as claimed in claim 4, wherein the timing mechanism is connected to the sun gear to effect rotation thereof.

6. A force generator as claimed in claim 5, wherein the sun gear is rotatably mounted to the frame, a timer control means for rotating the sun gear, at least four planetary gears interacting with the sun gear, each planetary gear being fixed to a respective minor axis.

* * * * *